United States Patent
Kitagawa et al.

(10) Patent No.: US 7,823,176 B2
(45) Date of Patent: Oct. 26, 2010

(54) DIGITAL BROADCAST RECEIVER

(75) Inventors: Masahiko Kitagawa, Kobe (JP);
Minoru Maehata, Kobe (JP); Mitsuru Sasaki, Kobe (JP); Yasuo Nakashima, Kobe (JP); Hideshi Nishizawa, Kobe (JP); Hideki Nakamura, Kobe (JP); Masahiro Kamiya, Kobe (JP)

(73) Assignee: Fujitsu Ten Limited, Kobe-Shi (JP)

( * ) Notice: Subject to any disclaimer, the term of this patent is extended or adjusted under 35 U.S.C. 154(b) by 1624 days.

(21) Appl. No.: 10/347,619

(22) Filed: Jan. 22, 2003

(65) Prior Publication Data

US 2003/0159144 A1 Aug. 21, 2003

(30) Foreign Application Priority Data

Jan. 22, 2002 (JP) ............................. 2002-012694

(51) Int. Cl.
*H04N 5/445* (2006.01)
(52) U.S. Cl. .................... 725/39; 725/75; 725/76
(58) Field of Classification Search .................. 725/44, 725/46, 47, 41, 75, 33; 455/421
See application file for complete search history.

(56) References Cited

U.S. PATENT DOCUMENTS

| | | | | |
|---|---|---|---|---|
| 5,798,785 | A * | 8/1998 | Hendricks et al. ............... 725/46 |
| 6,177,931 | B1 * | 1/2001 | Alexander et al. ............ 725/52 |
| 6,246,442 | B1 * | 6/2001 | Harada et al. ................ 348/569 |
| 6,625,446 | B1 * | 9/2003 | Mochizuki ................... 455/421 |
| 6,637,029 | B1 * | 10/2003 | Maissel et al. ................. 725/46 |
| 7,124,426 | B1 * | 10/2006 | Tsuria et al. ................... 725/75 |
| 7,185,355 | B1 * | 2/2007 | Ellis et al. ...................... 725/46 |
| 7,209,632 | B2 * | 4/2007 | Nono ........................... 386/46 |
| 2002/0059603 | A1 * | 5/2002 | Kelts ............................ 725/47 |
| 2002/0059609 | A1 * | 5/2002 | Cragun et al. .................. 725/56 |
| 2002/0194593 | A1 * | 12/2002 | Tsuchida et al. ............... 725/32 |
| 2005/0273819 | A1 * | 12/2005 | Knudson et al. ............... 725/58 |
| 2006/0031883 | A1 * | 2/2006 | Ellis et al. ...................... 725/58 |

(Continued)

FOREIGN PATENT DOCUMENTS

EP 0 854 645 A2 7/1998

(Continued)

OTHER PUBLICATIONS

Notification of Reasons for Refusal issued in Japanese Patent Application No. 2006-320217; Jan. 19, 2010; with English-language translation.

*Primary Examiner*—Brian T Pendleton
*Assistant Examiner*—Jason K Lin
(74) *Attorney, Agent, or Firm*—Oliff & Berridge, PLC (57) ABSTRACT

FIG. 1 shows an electronic program guide unique to viewer A grouped from an electronic program guide based on electronic program guide data; the program type is set in an (a) column and the display mode of each program is set in a (b) column. In FIG. 1, a news program is displayed in text and a music program is displayed in an icon of musical notes on a music sheet. A sports program is displayed in an icon of a bat and a ball. Since the music program and the sports program are thus displayed in such icon images of reminding the viewer of the program contents, the viewer A can quickly determine the program contents visually.

1 Claim, 7 Drawing Sheets

U.S. PATENT DOCUMENTS

2006/0053448 A1 * 3/2006 Reichardt .................... 725/44

FOREIGN PATENT DOCUMENTS

| JP | A 9-270963 | 10/1997 |
| JP | A 9-275531 | 10/1997 |
| JP | 11284925 | * 10/1999 |
| JP | A 11-284925 | 10/1999 |
| JP | A 11-313260 | 11/1999 |
| JP | A-2000-13706 | 1/2000 |
| JP | A 2000-013706 | 1/2000 |
| JP | A 2000-358200 | 12/2000 |
| JP | A 2001-008121 | 1/2001 |
| JP | A-2001-285734 | 10/2001 |
| WO | WO 01/86947 | * 11/2001 |

* cited by examiner

FIG. 1

| VIEWER \ ITEM | (a) PROGRAM | (b) DISPLAY MODE | |
|---|---|---|---|
| A | NEWS | TEXT | |
| | MUSIC |  | ← Ta |
| | SPORTS |  | |
| | ⋮ | ⋮ | |

FIG. 2

| VIEWER \ ITEM | (a) PROGRAM | (b) DISPLAY MODE | |
|---|---|---|---|
| B | COOKING |  | |
| | DRAMA |  | ← Tb |
| | WEATHER FORECAST | TEXT | |
| | ⋮ | ⋮ | |

FIG. 3

| VIEWER \ ITEM | (a) PROGRAM | (b) DISPLAY MODE | |
|---|---|---|---|
| C | MUSIC |  | |
| | SPORTS |  | ← Tc |
| | ANIMATION |  | |
| | ⋮ | ⋮ | |

DIGITAL BROADCAST RECEIVER

The present disclosure relates to the subject matter contained in Japanese Patent Application No. 2002-12694 filed on Jan. 22, 2002, which is incorporated herein by reference in its entirety.

BACKGROUND OF THE INVENTION

1. Field of the Invention

This invention relates to a digital broadcast receiver for displaying on a display a unique electronic program guide grouped according to each viewer from an electronic program guide based on electronic program guide data and for reflecting information responsive to the reception sensitivity on the unique electronic program guide when a program is watched on the digital broadcast receiver which is installed in a vehicle.

2. Description of the Related Art

Recently, a digital broadcast receiver for watching programs of multiple channels such as satellite broadcasting has become widespread. In the digital broadcast receiver, a TS (Transport Stream) wherein data of a plurality of channels of television (TV) broadcasting is multiplexed is selected and is played back. An EPG (Electronic Program Guide) is added to the TS.

An electronic program guide for displaying the program contents in text information corresponding to broadcast time for each channel is known. The viewer can display the electronic program guide on a display at any time and can watch the program contents. Thus, when digital broadcasting is watched, if an electronic program guide is displayed on the display, the program contents can be checked, so that the advantage that service for the viewer is improved is provided.

An electronic program guide in a related art is displayed in a mode of text information only or images of icons simplified so as to remind the viewer of the program contents. The electronic program guide displayed with icons is uniformly formed regardless of the characteristics of the viewers such as the age or the gender. The electronic program guides are prepared by digital broadcast receivers based on the EPG data and provide roughly similar display contents although they differ slightly in display mode from one model of digital broadcast receiver to another.

Thus, the viewer watches the electronic program guide in text information or uniformly formed icon images regardless of the characteristics of the viewer such as the age or the gender. Therefore, the ease of use of the electronic program guide may not be good for each viewer. For example, to display a sports program in an icon, there is demand for changing the icon between childs and adults. Thus, in the related art, there is a problem of incapability of meeting the demand for displaying an electronic program guide in a different mode in response to the characteristics of each viewer.

To install a digital broadcast receiver in a mobile unit such as a vehicle, the reception sensitivity may change with running of the vehicle. In such a case, if the viewer watches a broadcast program selected out of channels displayed in the electronic program guide, image degradation is remarkable and thus the viewer's pleasure may be dampened; this is a problem.

SUMMARY OF THE INVENTION

It is therefore an object of the invention to provide a digital broadcast receiver for displaying on a display a unique electronic program guide grouped according to each viewer from an electronic program guide based on electronic program guide data and for reflecting information responsive to the reception sensitivity on the unique electronic program guide when a program is watched on the digital broadcast receiver which is installed in a vehicle.

To the end, according to a first aspect of the invention, there is provided a digital broadcast receiver including a tuner, a display, a program guide preparation section, and a program guide register section. The tuner tunes in to a broadcast program. The display displays an electronic program guide based on electronic program guide data of broadcast programs. The program guide preparation section prepares a unique electronic program guide, in which the broadcast programs are grouped in text information and an image in accordance with content of the broadcast programs, from the electronic program guide data. The program guide register section registers the unique electronic program guide therein.

According to a second aspect of the invention, the program guide preparation section prepares the unique electronic program guide for each viewer.

Thus, a unique electronic program guide grouped from electronic program guide, which is based on the electronic program guide data, according to each viewer is displayed with considering the characteristics of the gender and the age of each viewer. Thus, the electronic program guide matching the actual state of the viewer can be set.

According a preferred mode, in the digital broadcasting receiver according to the first and second aspects, the registered unique electronic program guide and the normal electronic program guide based on the electronic program guide data can be switched therebetween to be displayed on the display.

Thus, the normal electronic program guide can be switched to the previously registered unique electronic program guide to be displayed on the display. Thus, the electronic program guide can be watched easily in response to the broadcast watching situation.

According to a third aspect of the invention, the digital broadcasting receiver is mounted on a vehicle. The group of the unique electronic program guide, which is displayed on the display in response to a condition of the vehicle, can be set in advance.

Thus, the electronic program guide can be displayed with considering the special characteristics as the digital broadcast receiver installed in a vehicle such as the vehicle seat position where the viewer sits and use or no use of a room light.

According to a fourth aspect of the invention, the digital broadcasting receiver is mounted on a vehicle. The group of the unique electronic program guide, which is displayed on the display in response to current time, can be set in advance.

Thus, the electronic program guide is automatically switched in response to the current time of watching the program, so that the advantage that the need for operation of the viewer is eliminated is provided.

According to a fifth aspect of the invention, the digital broadcasting receiver is mounted on a vehicle. The group of the unique electronic program guide, which is displayed on the display in response to start time of a preselected program, can be set in advance.

Thus, the unique electronic program guide is displayed in response to the start time of the program to be watched, so that the need for operation of the viewer is eliminated.

According to a sixth aspect of the invention, in the unique electronic program guide, a broadcast program with poor reception state is displayed in distinction from other broadcast programs.

Thus, the viewer can select the program in a good reception state from the beginning, so that switching operation from the program in a poor reception state to the program in a good reception state becomes unnecessary.

According to a seventh aspect of the invention, the digital broadcasting receiver further includes a watching preselection registration section for registering preselection for watching a broadcast program. The display displays the unique electronic program guide with putting a mark on the preselected broadcast program.

Thus, a mark is put on the program preselected for watching, so that the viewer can check the program preselected for watching on the display.

According to an eighth aspect of the invention, in the digital broadcasting receiver of the seventh aspect, the program guide preparation section prepares the unique electronic program guide for each viewer.

According to a ninth aspect of the invention, the digital broadcasting receiver is mounted on a vehicle. When the vehicle runs, whether or not reception state of the preselected broadcast program is improved is detected. When it is detected that the reception state of the preselected program is improved, a message is displayed on the display.

Thus, fluctuation in the reception state as the vehicle runs is always detected, so that if the viewer rides in the vehicle, when the program preselected for watching is switched, the viewer can cope with the situation. Since a message to the effect that the reception state of the program preselected for watching has been improved is displayed on the display, the viewer can determine whether or not the current program being watched is to be switched to the program preselected for watching.

According to a tenth aspect of the invention, the digital broadcasting receiver further includes a watching preselection registration section, a first time setting section, and a first preselection cancel section. The watching preselection registration section registers preselection for watching a broadcast program. The first time setting section sets a first time. The first preselection cancel section automatically cancels the preselection when the first time has elapsed since a start time of the preselected broadcast program.

According to an eleventh aspect of the invention, in the digital broadcasting receiver of the tenth aspect, the program guide preparation section prepares the unique electronic program guide for each viewer.

Thus, the preselection for watching is automatically canceled after the expiration of the given time since the broadcast start time of the program preselected for watching. Thus, if the viewer does not want to view the preselected program, a measure can be taken.

According to a twelfth aspect of the invention, the digital broadcasting receiver further includes an expiry time specifying section and a second preselection cancel section. The expiry time specifying section specifies preselection expiry time of the preselected broadcast program. The second preselection cancel section automatically cancels the preselection when the expiry time is exceeded.

Thus, the preselection for watching is automatically canceled after the expiration of the expiry time of the preselection for watching, so that preselection cancel operation of the viewer becomes unnecessary.

According to a thirteenth aspect of the invention, the first time is set in a percentage of the whole broadcast time of the broadcast program.

Thus, to cancel the preselection for watching, the passage time of the watching preselection time is set in a percentage of the whole broadcast time of the program. Thus, the whole time of the program need not be considered.

In a preferred mode, the viewer is notified of the expiry time of the watching preselection setting.

According to the mode, the viewer is notified of the expiry time of the watching preselection setting. Thus, the viewer can be prevented from forgetting program preselection.

In a preferred mode, to notify the viewer of the expiry time of the watching preselection setting, a message is displayed in a corner of the display.

According to the mode, the viewer can visually check the expiry time of the watching preselection setting.

According to a fourteenth aspect of the invention, the expiry time of the preselection is notified to a viewer every predetermined period.

Thus, the viewer is notified of the expiry time repeatedly each time the given time has elapsed, so that the viewer can reliably check the expiry time of the watching preselection setting.

In a preferred mode, to notify the viewer of the expiry time of the watching preselection setting, a voice message is issued each time the given time has elapsed.

According to the mode, the viewer can aurally check the expiry time of the watching preselection setting.

In a preferred mode, a section for notifying the viewer of the expiry time of the watching preselection setting can be preset singly or in combination.

According to the mode, the viewer can set the expiry time of the preselection for watching by any desired sections.

In a preferred mode, the expiry time of the preselection for watching can be preset as default setting.

According to the mode, the viewer need not set the expiry time of the preselection for watching each time; the ease of use is improved.

In a preferred mode, when the expiry time of the preselection for watching has elapsed, cancel of the preselection for watching is displayed on the display.

According to the mode, the viewer can visually check cancel of the preselection for watching.

In a preferred mode, when the expiry time of the preselection for watching has elapsed, a message as to whether or not the preselection for watching is to be canceled is displayed on the display.

According to the mode, the viewer determines whether or not the preselection for watching is to be canceled, and can perform necessary operation.

In a preferred mode, the digital broadcast receiver is a digital broadcast receiver for displaying an electronic program guide based on electronic program guide data of a broadcast program selected in a tuner and is provided with a separate tuner from the tuner for monitoring the reception sensitivity of the broadcast program selected for watching.

According to the mode, the viewer can monitor the reception sensitivity of the broadcast program selected for watching even while the viewer is watching another program.

According to a fourteenth aspect of the invention, there is provided a digital broadcasting receiver including a tuner and a display. The tuner tunes in to a broadcast program. The display displays an electronic program guide based on electronic program guide data of broadcast programs. When a commercial program is received, the tuner is used as a tuner for monitoring reception sensitivity of preselected broadcast program for watching.

Thus, the single tuner enables the viewer to monitor the reception sensitivity of the preselected program for watching, so that the cost can be decreased.

According to a sixteenth aspect of the invention, there is provided a digital broadcasting reception method comprising the steps of displaying an electronic program guide based on electronic program guide data of broadcast programs, preparing a unique electronic program guide, in which the broadcast programs are grouped in text information and an image in accordance with content of the broadcast programs, from the electronic program guide data, and registering the unique electronic program guide.

DETAILED DESCRIPTION OF THE PREFERRED EMBODIMENTS

Figure 12:
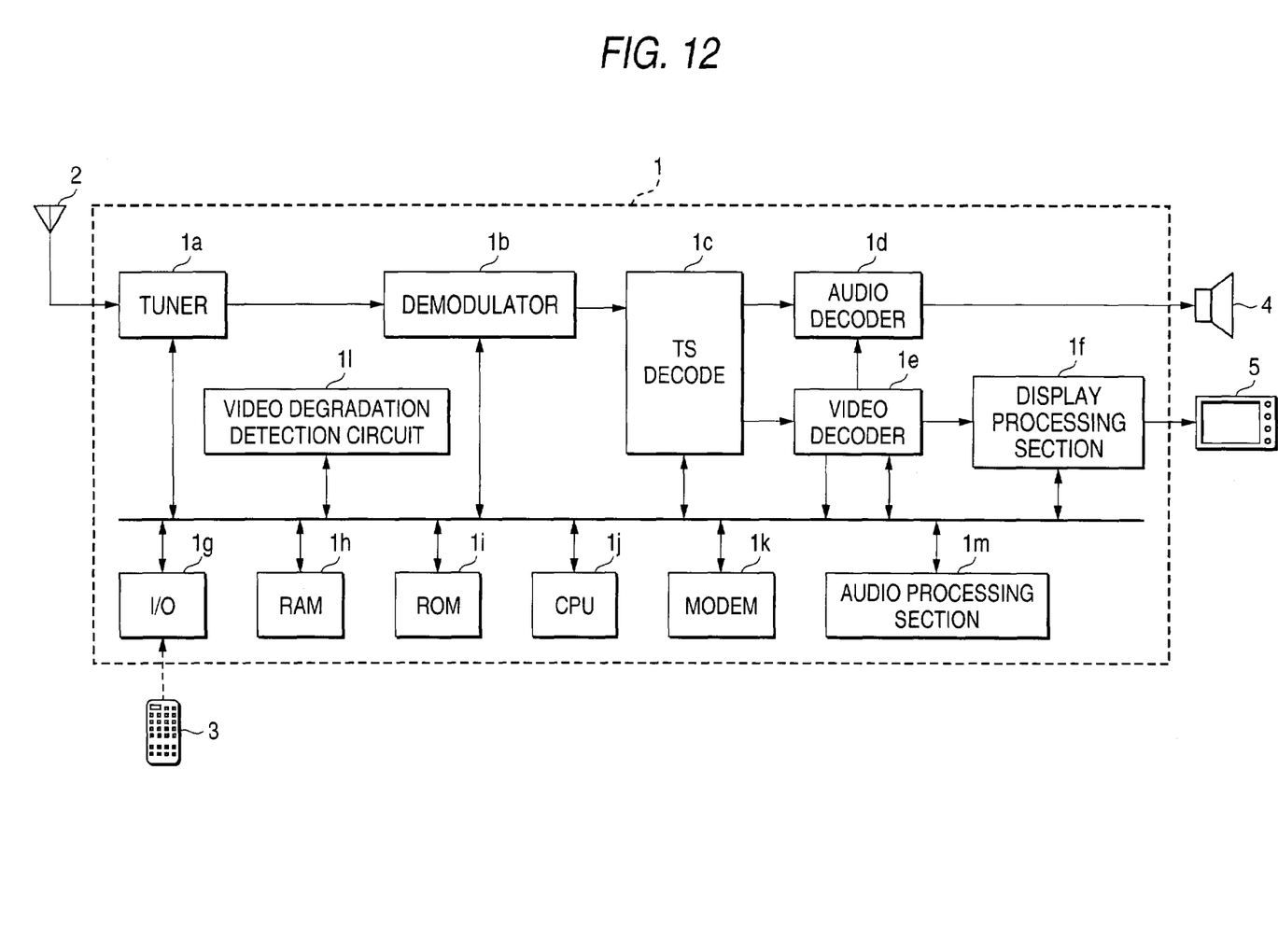
FIG. 12 is a block diagram to show an example of a digital broadcast receiver into which the invention is incorporated.

Referring now to the accompanying drawings, embodiments of the invention will be described. FIG. 12 is a block diagram to show an example of a digital broadcast receiver into which the invention is incorporated. In FIG. 12, a digital broadcast receiver 1 receives digital broadcast waves at an antenna 2. The digital broadcast receiver 1 includes a tuner 1a and one broadcast wave is selected as the receiver 1 is tuned by the tuner 1a.

The broadcast wave selected by the tuner 1a is demodulated by a demodulator 1b in 64 QAM (Quadrature Amplitude Modulation) system, etc. The signal provided by the demodulator 1b is then separated into an MPEG audio signal and an MPEG video signal by a TS decoder 1c. Further, the MPEG audio signal and the MPEG video signal are decoded by an audio decoder 1d and a video decoder 1e. The MPEG audio signal is output from an output terminal to a loudspeaker 4. The MPEG video signal is subjected to display processing by a display processing section 1f and is output from an output terminal to a display 5.

The digital broadcast receiver 1 also includes an input/output interface I/O 1g, RAM 1h, ROM 1i, a CPU (Central Processing Unit) 1j, a modem 1k, a video degradation detection circuit 1l, and an audio processing section 1m. A signal from an operation section 3 such as a remote control key is detected in the I/O 1g and the digital broadcast receiver 1 is turned on or off or the corresponding channel is selected.

Unique program guides prepared in various formats by the viewer whenever necessary as described later are registered in the RAM 1h. A management program for operating the digital broadcast receiver 1 and the like are stored in the ROM 1i. The CPU 1j controls the operation of the digital broadcast receiver 1 by a predetermined program. The modem 1k codes and decodes an external signal. The video degradation detection circuit 1l detects the reception sensitivity of the digital broadcast receiver. The audio processing section 1m provides the viewer with various voice messages.

A preferred embodiment is characterized by the fact that since the viewers of digital broadcasting are distributed in the age brackets from childs to aged persons in genders of males and females, grouping is performed from the received original electronic program guide and a unique electronic program guide prepared in response to the characteristics and taste of each person can be displayed. That is, for example, for an child group in a family, an electronic program guide is formed centering on icon images and is displayed.

For an adult group of housewives, etc., an electronic program guide is formed with appropriately using text and icon images for highly frequently watched programs and is displayed. Thus, considering the characteristics of the gender, the age, etc., of each viewer, a peculiar electronic program guide grouped according to the viewer is displayed, so that the electronic program guide matching the actual situation of the viewer watching programs can be set.

Figure 1:
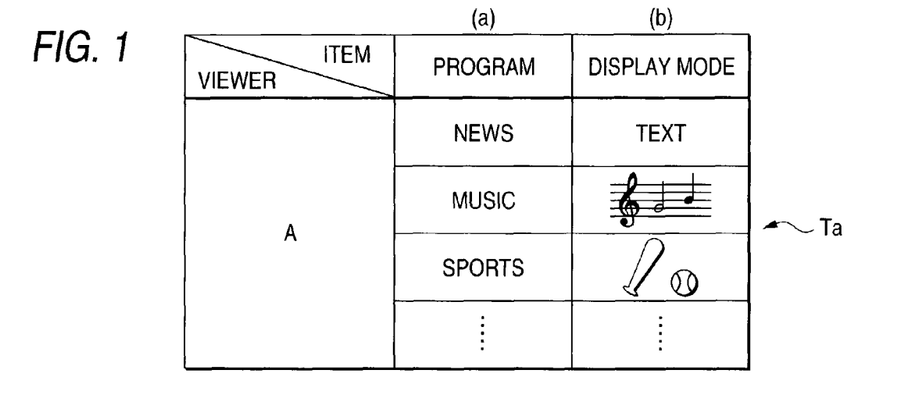
FIG. 1 shows a display mode example indicating an electronic program guide unique to adult viewer A.
Figure 2:
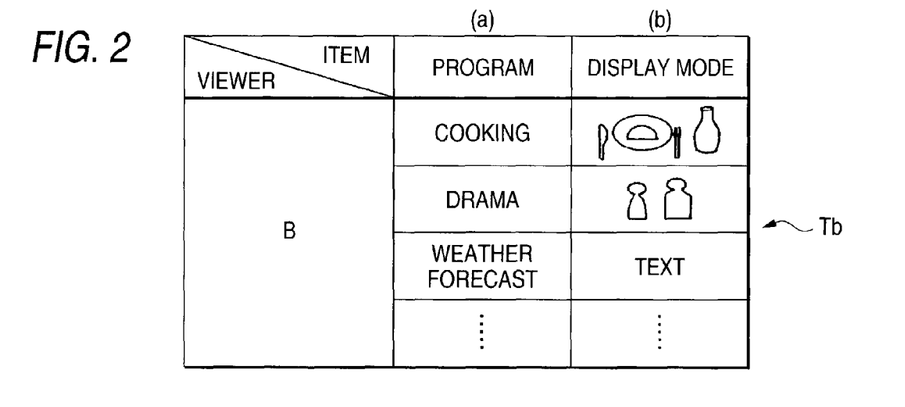
FIG. 2. shows an electronic program guide unique to housewife viewer B.
Figure 3:
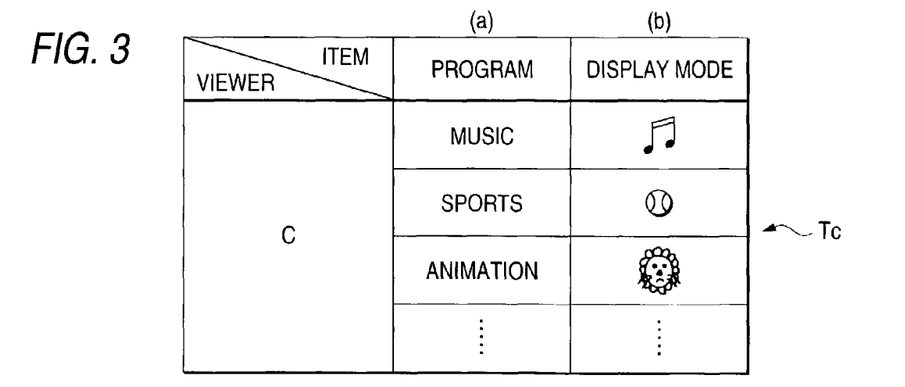
FIG. 3 also shows an electronic program guide unique to child viewer C.

FIGS. 1 to 3 are schematic representations to show examples of such grouped electronic program guides. FIG. 1 shows a display mode example indicating an electronic program guide unique to adult viewer A (text-picture displayed in program frame); the program type is set in an (a) column and the display mode of each program is set in a (b) column. In FIG. 1, a news program is displayed in text and a music program is displayed in an icon of musical notes on a music sheet. A sports program is displayed in an icon of a bat and a ball. Since the music program and the sports program are thus displayed in such icon images of reminding the viewer of the program contents, the viewer A can quickly determine the program contents visually.

Like FIG. 1, FIG. 2 shows an electronic program guide unique to housewife viewer B. In FIG. 2, a cooking program and a drama program are displayed in such icon images of reminding the viewer of the program contents. A weather forecast is displayed in text. Thus, in the examples in FIGS. 1 and 2, the electronic program guides unique to the viewers are displayed using text information and icon images appropriately in combination, so that the electronic program guides easily used by the viewers can be provided.

Like FIG. 1, FIG. 3 also shows an electronic program guide unique to child viewer C. In FIG. 3, a music program, a sports program, and an animation program are displayed in such icon images of reminding the viewer of the program contents. As the icon images of the music program and the sports program, such icon images simpler than those for the viewer A for enabling even an child to precisely determine the program contents are adopted.

Thus, the electronic program guide is displayed with the icon image mode changed in response to the age bracket although the program contents are the same, so that finer measures can be taken for the viewers. The electronic program guides peculiar to the viewers as shown in FIGS. 1 to 3 are grouped and are registered in the RAM 1h in FIG. 12.

To display an electronic program guide, the CPU 1j shown in FIG. 12 prepares an electronic program guide unique to the viewer based on the received program guide data and the data stored and registered in the RAM 1h and displays the prepared electronic program guide. The viewer (type) is determined (switched) based on the specification operation of the viewer, for example, operation of the remote control key 3.

Figure 4:
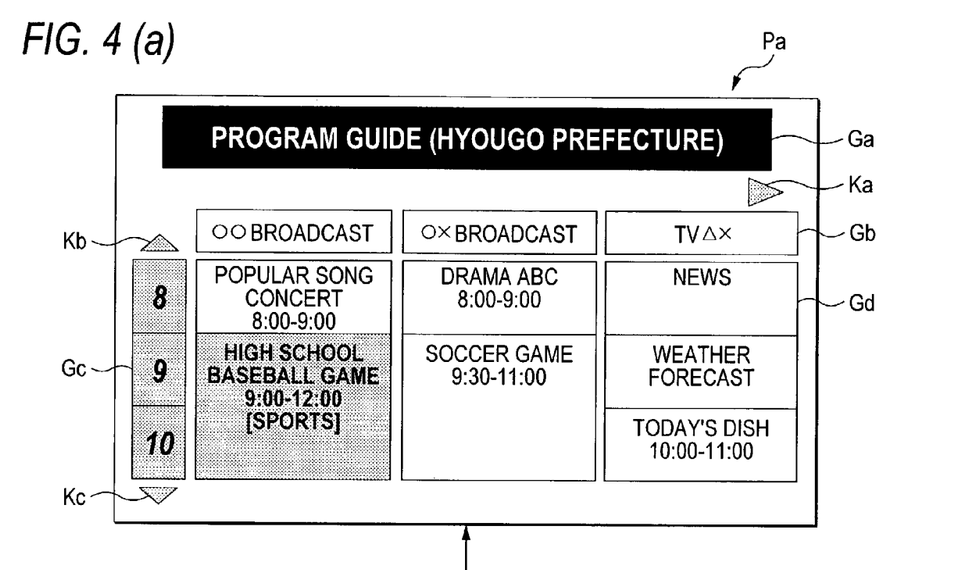
FIGS. 4(a) and 4(b) are schematic representations to show examples of electronic program guide display of the digital broadcast receiver according to embodiment of the invention.

FIG. 4 is a schematic representation to show an example of electronic program guide display of the digital broadcast receiver according to embodiment of the invention. FIG. 4(a) shows an original electronic program guide Pa formed in text information. The title of the program guide (Hyougo Prefecture) is entered in a Ga field. The broadcast station names are entered in a Gb field. The broadcast times are entered in a Gc field. The contents of each program broadcasted at one broadcast time by one broadcast station are entered in text in a Gd field.

Ka in FIG. 4(a) denotes a horizontal scroll key. As the key is pressed, the electronic program guide is scrolled and the program contents broadcasted by each broadcast station are displayed in order. Kb and Kc denote vertical scroll keys. As either of the keys is pressed, the broadcast time is scrolled and is displayed.

FIG. 4(b) shows an example wherein the electronic program guide Pa shown in FIG. 4(a) is switched to an electronic program guide Pb for display with one-touch operation through the operation section 3 in FIG. 12. In the electronic program guide Pb, the program contents displayed in the text information in the electronic program guide Pa are all replaced with such icon images of reminding the viewer of the program contents for display. The electronic program guide Pb is grouped and prepared from the original electronic program guide and is previously registered in the RAM 1h in FIG. 12, as described above. According to a signal from the operation section 3, the CPU 1j reads the electronic program guide Pb and displays the electronic program guide Pb on the display 5.

In the example in FIG. 4, the electronic program guide Pa formed only in the text information is thus replaced with the electronic program guide Pb unique to the viewer formed in the icon images with one-touch operation. Thus, the unique electronic program guide prepared in the easy-to-see format for the viewer can be displayed rapidly and easily based on the situation of watching digital broadcasting by the viewer.

The example in FIG. 4 is useful particularly for installing the digital broadcast receiver in a vehicle because various settings can be made in response to the situation. For example, even the electronic program guide in text information can be checked for the program contents in the driver's seat near to the display. However, it is made impossible to read the electronic program guide in text information in the passenger seat or the rear seat and thus the unique electronic program guide formed in the icon images is displayed. The electronic program guide formed in the icon images is thus preset, whereby the electronic program guide can be displayed with taking the vehicle seat position where the viewer sits into consideration.

When the vehicle runs, the electronic program guide can also be switched depending on whether or not a room light is used. That is, when the room light is not used, even the electronic program guide in text information is visible. However, when the room light is used, output light of the room light is reflected at the display and the text information becomes hard to read. Then, in such a case, the electronic program guide is switched to the electronic program guide unique to the viewer formed in the icon images and the electronic program guide unique to the viewer is displayed on the display.

Further, the electronic program guide can be displayed in response to the time at which the vehicle runs. For example, to watch an entertainment program at 5 PM or later, when 5 PM is reached, the electronic program guide Pa in the text information can be automatically switched to the electronic program guide unique to the viewer formed in the icon images.

Such switching of the electronic program guide responsive to the time at which the vehicle runs can also be set to a specific time on a specific day of the week. For example, at 5 PM on Sunday, the electronic program guide in text information is switched to the electronic program guide unique to the viewer formed in icon images. Automatic switching of the electronic program guide is thus performed in response to the situation and the current time when the electronic program guide is watched in the vehicle, whereby the advantage that the need for operation by the viewer is eliminated is provided.

The electronic program guide can also be switched in response to the program broadcast time. In the example in FIG. 4(b), a soccer game program is broadcasted at 9 PM by OX broadcast station. If the viewer operates electronic program guide display of the program broadcasted at 9 PM, the electronic program guide unique to the viewer formed in the icon image of the soccer game is displayed on the display.

Figure 5:
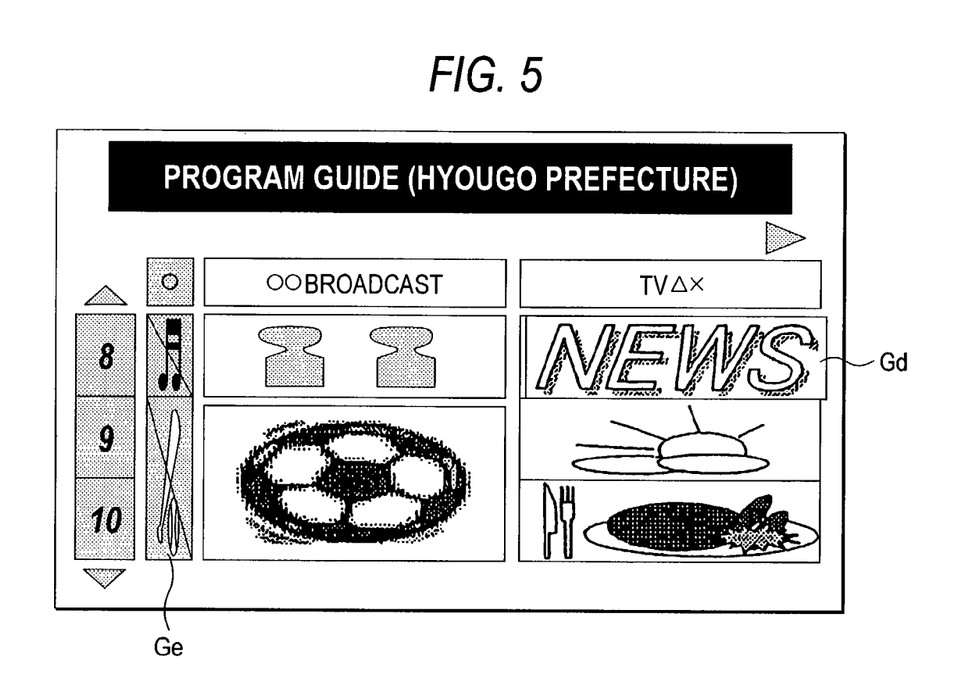
FIG. 5 is a schematic representation of an example of reflecting degradation of the reception state on display of an electronic program guide.

The digital broadcast receiver 1 of the invention includes the video degradation detection circuit 11 as shown in FIG. 12. Thus, the CPU 1j can determine whether or not the reception state of the broadcast wave of one broadcast station at one time is good. FIG. 5 is a schematic representation of an example of reflecting degradation of the reception state on display of an electronic program guide. In the example, an icon image Ge of the program at the broadcast station with the reception state degraded is displayed smaller than an icon Gd of the program of another broadcast station in the good reception state.

As the example of distinguishing the icon of the program of the broadcast station with the reception state degraded from the icon of the program of another broadcast station for display as in FIG. 5, the icon of the program with the reception state degraded may not be displayed on the display in another embodiment. The icon of the program with the reception state degraded may be displayed with the display color made lighter on the display. Since the icon of the program of the broadcast station with the reception state degraded is distinguished from the icon of the program of another broadcast station for display as in FIG. 5, the viewer can avoid selection of the program of the broadcast station with the reception state degraded and select and watch a program of a broadcast station in the good reception state.

In the invention, when the viewer displays his or her unique electronic program guide, a mark indicating program preselection can be displayed in the electronic program guide. Such preselected program for watching is marked in the electronic program guide, whereby the viewer can check with the electronic program guide as to whether or not any program is preselected for watching.

Figure 6:
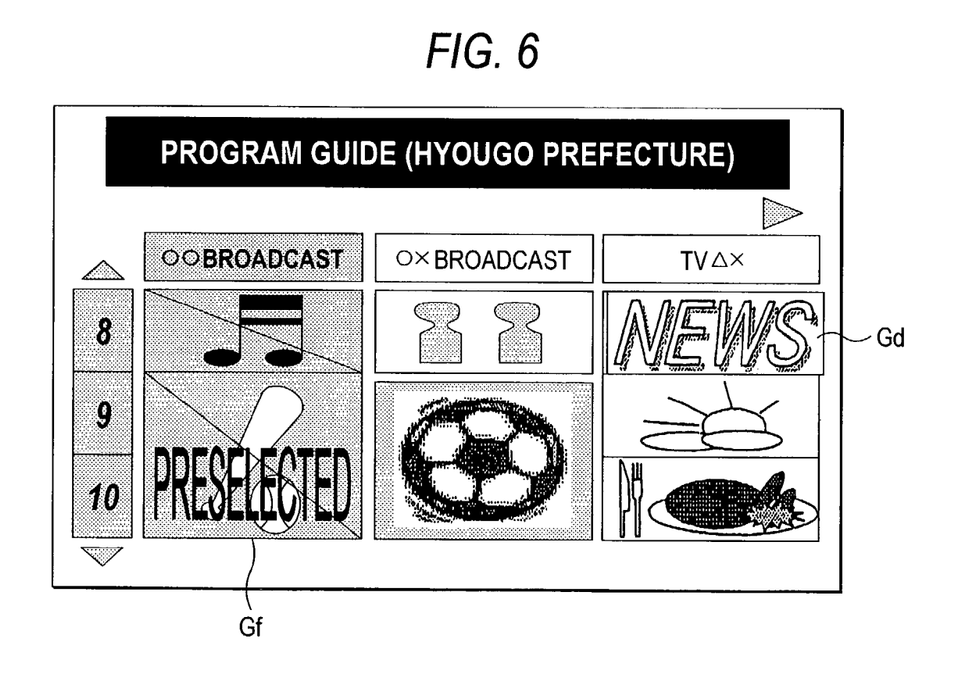
FIG. 6 is a schematic representation to show another embodiment of the invention.

FIG. 6 is a schematic representation to show another embodiment of the invention. In the embodiment, a program is preselected for watching. In FIG. 6, in the electronic program guide, sports program of OO broadcast station, for example, high-school baseball game program Gf is marked with a preselection mark of "preselected". Thus, the preselection mark is previously registered in the RAM 1h in FIG. 12 and is put on the unique electronic program guide for display.

In the example in FIG. 6, preselection for watching is set for the sports program the icon of which is distinguished from the icon of the program of another broadcast station for display because the reception state is degraded, as previously described with reference to FIG. 5. Thus, when the reception state is recovered for the sports program, the channel is preferentially switched to the sports program preselected for watching and the program is displayed.

Since automatic switching to the preselected program is thus performed in response to the reception state and the program is displayed, it is not necessary for the viewer to switch the channel several times for displaying the preselected program for watching to check the reception state, and the convenience of the viewer in watching the preselected program can be enhanced. The preselected program for watching not only is displayed in the case where the degraded reception state is recovered as in the example in FIG. 6, but also may be displayed at any time independently of the reception state.

Assume that when preselection for watching is set on one channel as in FIG. 6, the viewer watches a program on another channel at the reception degradation time of the one channel. In such a case, if the reception state is improved, the program is automatically switched to the preselected program for watching and the fear of dampening the viewer's pleasure occurs.

Figure 7:
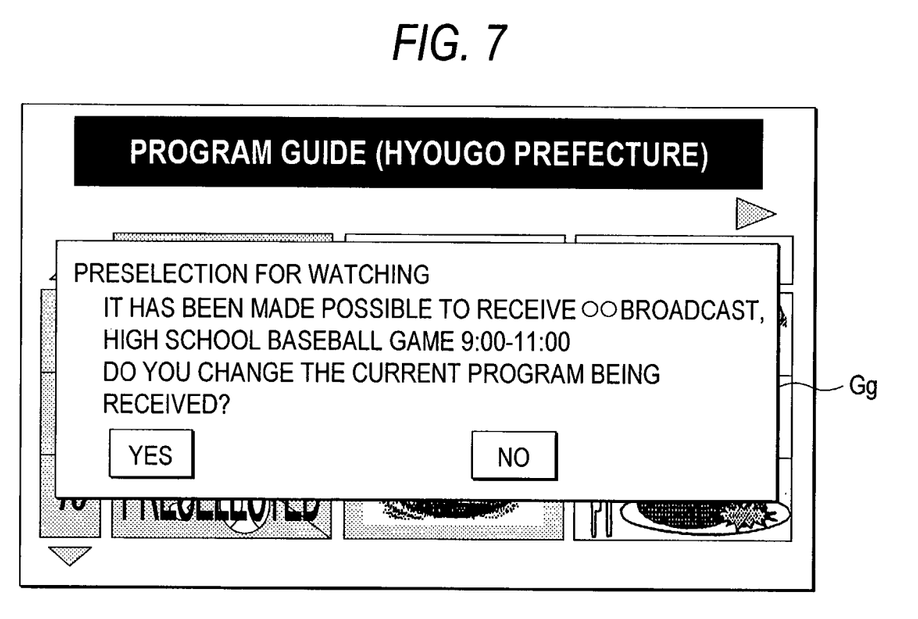
FIG. 7 is a schematic representation to show another embodiment of the invention.

Then, in the embodiment, a message Gg for informing the viewer that the reception state has been improved is displayed on the display as shown in FIG. 7. Thus, the viewer is previously informed that when it becomes possible to receive the preselected program for watching, the program will be switched, so that the viewer can select continuous watching of the current program being watched or switching channel.

In the example of preselecting the high-school baseball game for watching from 9 AM to 11 AM as in FIG. 6, the preselection for watching can be canceled after the expiration of a predetermined time since the preselection start time. If the predetermined time is set, for example, to 30 minutes, when 9:30 AM is exceeded, the preselection for watching is automatically canceled. Thus, if the viewer does not desire to watch the preselected program, operation of the viewer is not required.

The expiry time of preselection for watching can be set and the preselection can be canceled at a specific time after the expiration of the preselection time. In the example in FIG. 6, the expiry time of preselection for watching is set, for example, to 9:50 AM 50 minutes exceeding the preselection time. In this case, the preselection for watching the high-school baseball game is canceled at 9:50 AM. Since the preselection is thus automatically canceled at the setup time, if the viewer watches another program although he or she preselects one program for watching, cancel operation of the preselection for watching becomes unnecessary.

Preselection for watching a program can be canceled in accordance with the percentage of the elapsed time since the broadcast start time. In the example in FIG. 6, the broadcast time of the high-school baseball game preselected is two hours from 9 AM to 11 AM. In the example, if the percentage of the elapsed time is set to 50%, when 10 AM is exceeded, the preselection for watching is canceled. Since the preselection is thus canceled based on the elapsed time of a given percentage since the broadcast start time of the preselected program for watching, the preselection for watching can be rationally canceled without considering the whole broadcast time of the program.

Whenever a predetermined time has elapsed since the preselection start time for watching, the remaining broadcast time of the program can be displayed on the display. For example, whenever the time of 10 minutes has elapsed since the preselection start time for watching, a message such as "the remainder of the expiry time of preselection for watching is 30 minutes" or "the remainder of the expiry time of preselection for watching is 20 minutes" is displayed. Since the remaining broadcast time is thus displayed, the viewer can check the remainder of the broadcast time of the preselected program for watching.

When a message indicating the remainder of the broadcast time of the preselected program for watching is thus displayed on the display, in the invention, the message may be displayed at a position not interfering with video display, such as a corner of the screen. Thus, the viewer can check the remainder of the preselection time while watching the video display.

Whenever a predetermined time has elapsed since the preselection start time for watching, the remaining broadcast time of the program may be announced by voice. For example, whenever the time of 10 minutes has elapsed since the preselection start time for watching, a voice message such as "the remainder of the expiry time of preselection for watching is 30 minutes" or "the remainder of the expiry time of preselection for watching is 20 minutes" is announced to the viewer. Since the remaining broadcast time is thus announced by voice, the viewer can check the remainder of the broadcast time of the preselected program for watching independently of the screen display.

Figure 8:
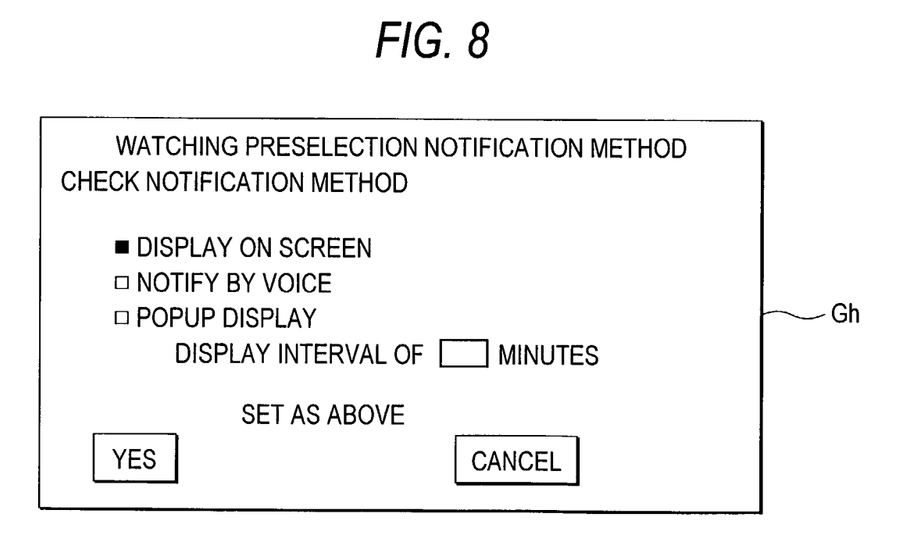
FIG. 8 is a schematic representation to show another embodiment of the invention.

FIG. 8 is a schematic representation to show another embodiment of the invention. In the example in FIG. 8, an expiry time notification method of preselection for watching can be selected out of a setting menu as a default setting in a system using the digital broadcast receiver. As shown in FIG. 8, the notification method is set as "display on screen," "notify by voice," or "popup display." The "popup display" enables the viewer to set the display interval, for example, 10 minutes. Thus, in the example in FIG. 8, the viewer can set the expiry time notification method of preselection for watching as his or her desired method.

In the embodiment, a condition of the expiry time of preselection for watching can also be set out of an expiry time specification menu of preselection for watching as a default setting in the system using the digital broadcast receiver. The condition of the expiry time of preselection for watching thus set can be stored in the RAM $1h$ in FIG. 12 for repetitive use.

Figure 9:
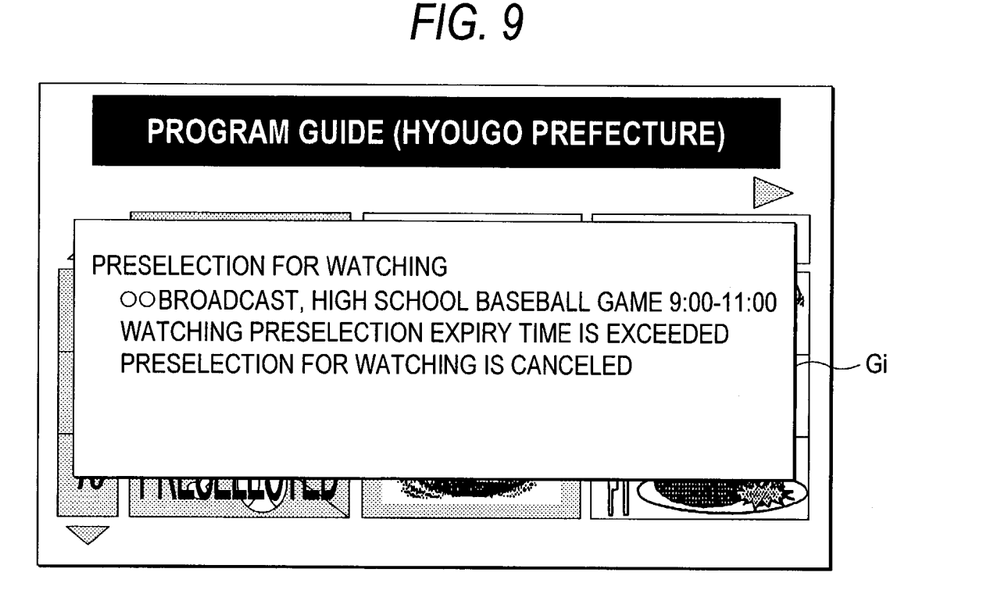
FIG. 9 is a schematic representation to show another embodiment of the invention.

FIG. 9 is a schematic representation to show another embodiment of the invention. In the example in FIG. 9, a message Gi indicating the expiration of the broadcast time of the preselected program for watching is displayed on a display. Cancel of preselection for watching is thus displayed on the display, whereby the viewer can check cancel of preselection for watching on the screen.

Figure 10:
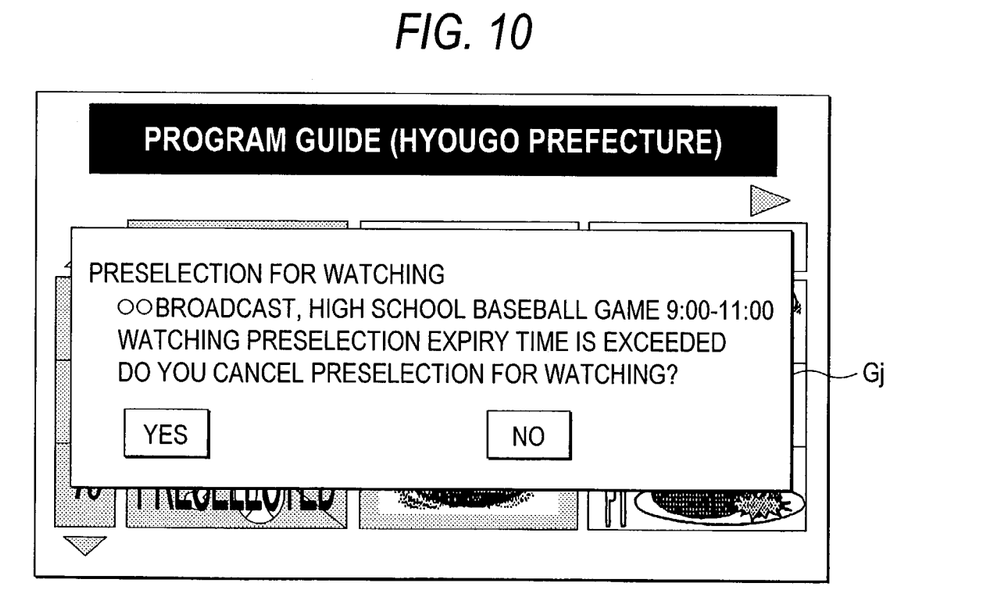
FIG. 10 is a schematic representation to show another embodiment of the invention.

FIG. 10 is a schematic representation to show another embodiment of the invention. In the example in FIG. 10, a message Gj for prompting the viewer to specify whether or not preselection for watching is to be canceled is displayed on a display. Thus, in the example in FIG. 10, the viewer determines whether or not preselection for watching is to be canceled, so that a situation in which preselection for watching is canceled in an involuntary way for the viewer can be circumvented.

Figure 11:
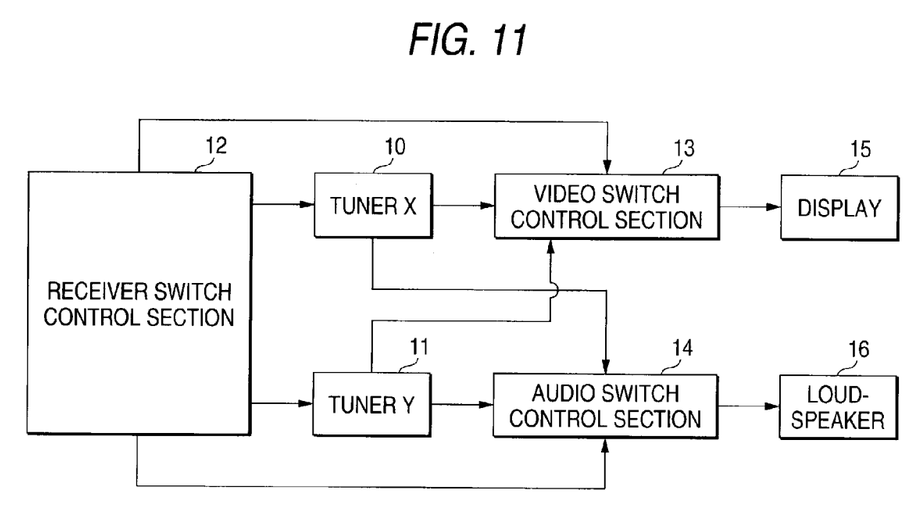
FIG. 11 is a block diagram to show another embodiment of the invention.

FIG. 11 is a block diagram to show another embodiment of the invention. In the example in FIG. 11, two tuners of a tuner X 10 and a tuner Y 11 are used. The tuner X selects the station of the program to be watched and displays the program on a display 15. The tuner Y monitors the reception sensitivity of the broadcast program preselected for watching.

If the tuner Y detects recovery of the reception sensitivity of the broadcast program preselected for watching, a receiver switch control section 12 sends a signal to a video switch control section 13 and an audio switch control section 14 for switching from the tuner X to the tuner Y. Video of the preselected program for watching, which is received in the tuner Y is displayed on the display 15 and audio is output from a loudspeaker 16. In the configuration in FIG. 11, while the viewer is watching the selected broadcast program, he or she can concurrently monitor the reception sensitivity of the preselected program for watching.

In another embodiment, only a single tuner is provided as shown in FIG. 12 and if a commercial is run while viewer is watching the selected program in the tuner, the tuner may be switched to a tuner for checking the reception sensitivity of the preselected program for watching. Thus, the single tuner is assigned the different functions for the viewer to watch the selected program and check the reception sensitivity of the preselected program for watching, so that the cost can be decreased.

If the degraded reception sensitivity is not improved as a result of checking the reception sensitivity of the preselected program for watching in the single tuner as described above, watching the current program is continued without switching to the preselected program for watching. When the time of preselection for watching has elapsed, preselection for watching can be canceled as described above.

As described above, according to the invention, there can be provided the digital broadcast receiver for displaying on a display a unique electronic program guide grouped according to each viewer from an original electronic program guide and when a program is watched on the digital broadcast receiver which is installed in a vehicle, for reflecting information responsive to the reception sensitivity on the unique electronic program guide.

What is claimed is:

1. A digital broadcasting receiver comprising:
   a tuner for tuning in to a broadcast program; and
   a display for displaying an electronic program guide based on electronic program guide data of broadcast programs,
   wherein when a commercial program is received by the tuner while tuning in to one broadcast program, the tuner is used as a tuner for monitoring reception sensitivity of another preselected broadcast program for watching, and the display displays a reception image indicating the reception sensitivity monitored by the tuner.

* * * * *